(12) United States Patent
DeWhitt

(10) Patent No.: US 7,758,729 B1
(45) Date of Patent: Jul. 20, 2010

(54) SYSTEM FOR RECYCLING PLASTICS

(75) Inventor: Kevin C. DeWhitt, Longview, WA (US)

(73) Assignee: Plas2Fuel Corporation, Tigard, OR (US)

( * ) Notice: Subject to any disclaimer, the term of this patent is extended or adjusted under 35 U.S.C. 154(b) by 283 days.

(21) Appl. No.: 11/510,489

(22) Filed: Aug. 24, 2006

(51) Int. Cl.
*C10B 1/00* (2006.01)

(52) U.S. Cl. .................. 202/87; 202/131; 202/136; 202/137; 202/216; 202/226

(58) Field of Classification Search .......... 202/87, 202/131, 136, 137, 216, 226; 208/131
See application file for complete search history.

(56) References Cited

U.S. PATENT DOCUMENTS

| | | | |
|---|---|---|---|
| 4,164,484 A | 8/1979 | Tokuda | |
| 4,220,480 A * | 9/1980 | Dwan | 134/5 |
| 5,269,947 A | 12/1993 | Baskis | |
| 5,321,174 A | 6/1994 | Evans | |
| 5,359,061 A | 10/1994 | Evans | |
| 5,360,553 A | 11/1994 | Baskis | |
| 5,623,863 A * | 4/1997 | Plantan | 92/63 |
| 5,731,483 A | 3/1998 | Stabel | |
| 5,744,668 A | 4/1998 | Zhou | |
| 5,820,736 A * | 10/1998 | Bouziane et al. | 202/136 |
| 5,821,396 A * | 10/1998 | Bouziane | 585/241 |
| 5,824,193 A | 10/1998 | Edwards | |
| 5,824,709 A | 10/1998 | Suka | |
| 5,836,524 A | 11/1998 | Wang | |
| 5,849,964 A | 12/1998 | Holighaus | |
| 5,973,217 A | 10/1999 | Hastrich | |
| 6,011,187 A | 1/2000 | Horizoe | |
| 6,150,577 A | 11/2000 | Miller et al. | |
| 6,172,271 B1 | 1/2001 | Horizoe | |
| 6,190,542 B1 | 2/2001 | Comolli | |
| 6,288,296 B1 | 9/2001 | Miller | |
| 6,534,689 B1 | 3/2003 | Stankevitch | |
| 2002/0070104 A1* | 6/2002 | Nichols | 201/1 |
| 2002/0072640 A1 | 6/2002 | Nichols | |
| 2002/0156332 A1 | 10/2002 | Jiang | |
| 2003/0047437 A1 | 3/2003 | Stankevitch | |
| 2003/0050519 A1 | 3/2003 | Cheng | |
| 2004/0050678 A1* | 3/2004 | Takahashi et al. | 202/108 |
| 2005/0132883 A1* | 6/2005 | Su et al. | 95/235 |

\* cited by examiner

*Primary Examiner*—N. Bhat
(74) *Attorney, Agent, or Firm*—Stoel Rives LLP; Samuel E. Webb

(57) ABSTRACT

One embodiment of a method of recycling a plastic material includes heating a plastic material in a treatment chamber in incremental steps through a series of graduated temperature set points wherein each graduated temperature set point corresponds to a vaporization temperature of an individual byproduct of said plastic material, and pulling a vacuum of inert gas on the treatment chamber at each temperature set point to selectively remove an individual by-product corresponding to the temperature set point.

14 Claims, 3 Drawing Sheets

SYSTEM FOR RECYCLING PLASTICS

The creation of a mounting surplus of waste plastics has increasingly negative environmental, economical and political implications. Recycling waste plastic into usable end products has heretofore been commercially unviable due to the production of a blend of undesirable by-products that is difficult to further separate or process, and the large energy costs associated with the recycling process itself. It may be desirable to provide a system and method of recycling plastics that reduces the problems associated with undesirable by-products and that reduces the energy costs of the recycling process.

DETAILED DESCRIPTION OF THE DRAWINGS

Figure 1:
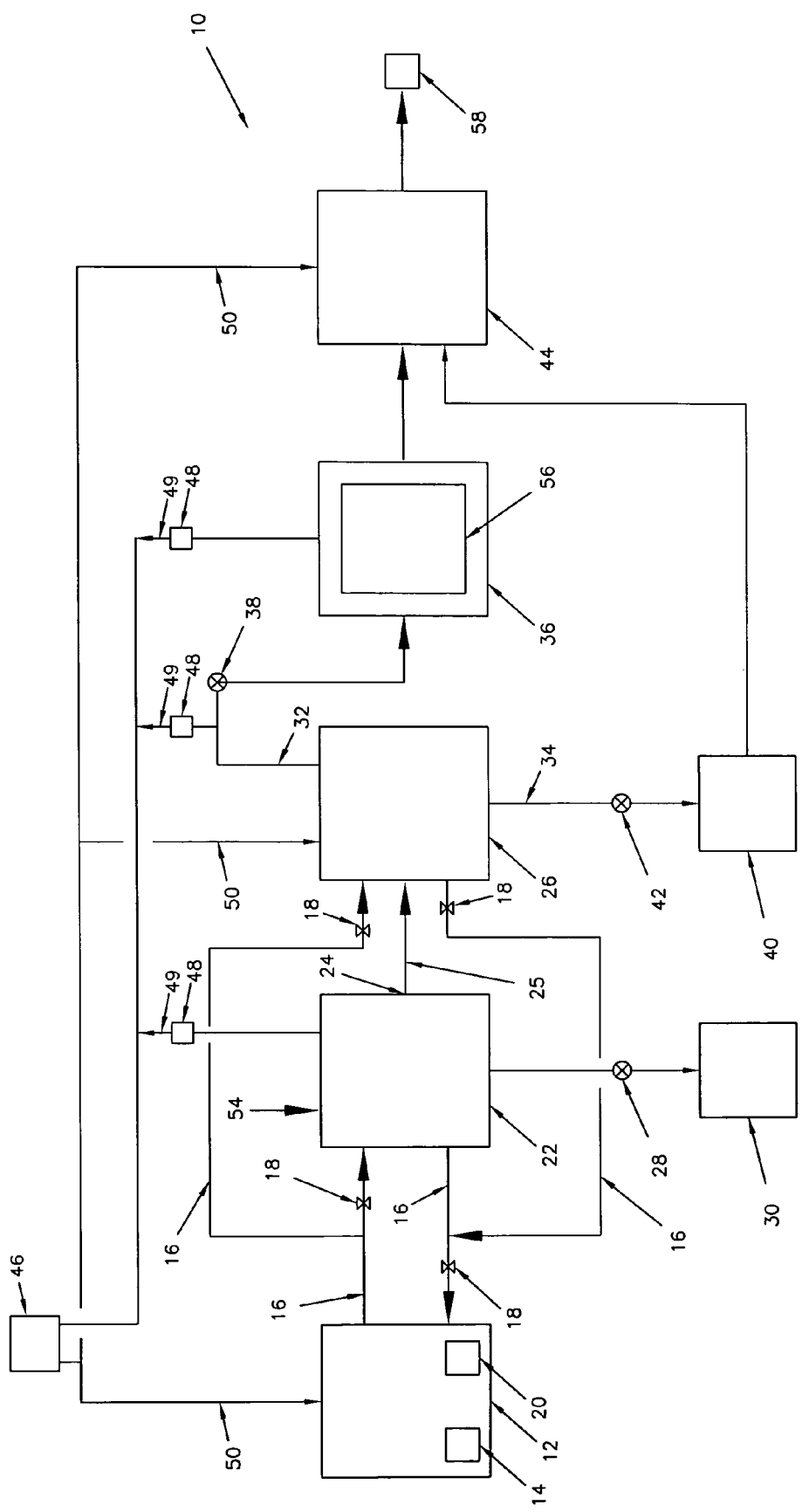
FIG. 1 represents a schematic view of a recycling system according to one embodiment of the present invention.

FIG. 1 represents a schematic view of a recycling system 10 according to one embodiment of the present invention. System 10 may be described generally as a system for recycling waste plastic materials that provides dynamic, real-time process control. The system allows the user to easily process comingled sources of mixed waste plastic that may contain trace levels of non-plastic contamination such as foodstuffs, labeling, soil, and the like. The system uses a controllable energy system and vacuum (negative pressure) to control a third variable, namely, dwell time within the treatment chamber, to completely control the recycling process.

In particular, the system provides a process for separately removing individual by-products of the waste plastic such that the by-products themselves are marketable end products. Some of the individual by-products removed by the present system include chlorine (found in polyvinylchloride plastics), bromine (utilized as a flame retardant in many plastics), water (found on wet feedstock), and the like.

System 10 (shown schematically in this figure) includes a recirculating energy system 12 that may include a gas manifold/burner system 14, ductwork 16 to direct the flow of heated air, damper vents 18 capable of introducing or dispersing fresh air, exhaust air and supply air, and a variable-supply air fan 20 capable of metering the amount of air heated by burner system 14.

System 10 may further include an air-tight process reactor 22 with the ability to hold a vacuum, and which may be completely contained within the recirculating air system. Accordingly, the energy contained in the air from burner system 14 may be transferred to the contents of the reaction chamber of reactor 22. The reactor 22 may include a vapor exit port 24 connected directly to a vapor treatment vessel 26, such as a reflux heat exchanger, via piping 25. The reactor 22 may also include a valved solid-waste material port 28 at the bottom of the chamber. A waste material container 30 may be connected to the valved process reactor 22 solid waste material port 28.

Vapor treatment vessel 26 may be directly linked to process reactor 22 via piping 25. The internal temperature of vessel 26 may be controlled by energy system 12 or a thermal fluid medium within the vessel, which may control the temperature of vessel 26 by transferring energy either into or out of vessel 26. The vapor treatment vessel 26 may be equipped with two exit ports, a top exit port 32 and a bottom exit port 34.

Top exit port 32 of vapor treatment vessel 26 may be connected to a vapor scrubbing system 36 via a valved pipe train 38. A bulk oil collection vessel 40 may be connected via a valved pipe train 42 to bottom exit port 34 of vapor treatment vessel 26. A source of negative pressure, such as a pressure system, namely a vacuum system 44, may be connected to vapor scrubber 36.

A process control system 46 may include computer operable instructions that may utilize the output 49 from chemical process feedback sensors 48 which may be connected to each of processor reactor 22, to treatment vessel 26, and to scrubber 56. These sensors 48 may generate process feedback loops 50 that provide information to recirculating energy system 12, vapor treatment vessel 26 and to vacuum system 44, in order to control and modify the process on a real-time basis. Much of the equipment utilized in this process will be well known to chemical or process engineers skilled in the art.

The method of the invention will now be described in detail. In particular, the invention provides for the pyrolytic cracking of plastic materials which involves heating the plastic material in the absence of oxygen so as to prevent combustion (as a potential reaction pathway) from occurring. First, ground or chipped plastic material 54 is introduced into process reactor 22. Plastic material 54 may be introduced by any means, such as by a screw auger (not shown) or the like. After material 54 is placed within reactor 22 the reactor is sealed and vacuum-tested for seal integrity. The reactor may then be purged with an inert gas, such as nitrogen, and then a vacuum pressure pulled thereon by use of vacuum system 44.

Energy system 12 is then activated, and the air surrounding reactor 22 is slowly heated as it circulates around the reactor through ductwork 16 and returns to the burner chamber of burner system 14. Controlling the amount of fresh air entering energy system 12, the amount of hot exhaust air leaving energy system 12, the intensity of burner 14, and the flow rate of air through energy system 12 utilizing damper vents 18, allows reactor 22 to be subjected to a precise temperature profile. Additionally, as reactor 22 is heated, a variable pressure (positive or negative pressure) may be applied to the reactor chamber using a pressure system, such as vacuum system 44. During heating of reactor 22, plastic materials 54 within the reactor may be agitated by any means, such as by a paddle 74 (see FIG. 3) positioned within reactor 22.

In this manner, three variables may affect the plastic material 54 inside reaction chamber 22, namely, temperature, pressure and dwell time. Together, these three parameters constitute a processing profile, which may be either static or dynamic. The processing profile may contain several sets of discrete predetermined set points which may govern the temperatures and pressures encountered by the bulk plastic material 54 during the course of processing. A change in set point conditions may include precise rates of change (versus time) in both the temperature and pressure parameters. An analogous example would be a gas chromatograph, which uses temperature rate programming and flow rate (of an inert gas) through a columnar material to achieve its objectives.

After sealing plastic material 54 in reactor 22 and initiating energy system 12, the bulk plastic material 54 may then be subjected to the initial, predetermined processing profile conditions, which may include a discrete temperature and pressure, as well as a temperature ramping rate, to move from the current (ambient) temperature to the first predetermined temperature and pressure set point in the processing profile. The ramping rate of the reactor temperature through several vaporization set point conditions may be chosen to be slow enough such that a particular chemical component will be completely vaporized and removed from reactor 22 prior to the next vaporization set point being reached. Accordingly, such a slow ramp rate of the reactor temperature may be defined herein as a discrete stepwise increase in temperature within reactor 22 because complete vaporization of one component is achieved before vaporization of the next component begins.

If the bulk plastic material 54 is composed of mixed plastic waste, contaminants are likely to be present in the mixture. Contaminants may include trace levels of water, food stuffs, paper or cellulose waste, chemical or biological wastes, and the like. Contaminants may also include specific molecules present in the polymer such as chlorine in the case of polyvinylchloride plastic, or bromine in the case of flame retardant materials embedded in the plastic. As the temperature in reactor 22 increases, specific chemical species reach their boiling point and begin to enter the vapor phase. Once these individual contaminants reach their boiling point, they will exit the reactor through piping 25 and move to vapor treatment vessel 26.

The processing profile may allow for this elemental or molecular speciation or separation of components of plastic material 54 by ramping to particular predetermined temperature and pressure set points and then maintaining these conditions for a finite length of time before moving forward in the profile. As an example, an initial set point from ambient conditions may be 100 degrees Celsius (° C.) and 0.95 atmospheres (atm), which may slightly exceed the boiling point conditions for water. At this first set point condition, any moisture in the form of water adhering to plastic 54 in reactor 22 will begin to boil and exit the reaction chamber due to the vacuum pressure pulled on reactor 22 by vacuum system 44. The vacuum system may pull the individual vaporized components from reactor 22 and into vessel 26 and thereafter into a fume scrubber 36. In another embodiment, a slow and steady temperature increase ramp rate may be utilized thereby allowing one component to be fully vaporized and removed before vaporization of a second component begins.

Referring again to the previous example, the water vapor will exit reactor 22 and will enter vapor treatment vessel 26, with the bulk plastic 54 and any other higher-boiling point materials remaining behind in a solid, semi-solid or liquid phase in reactor 22. In this manner, the undesirable contaminant water is separated from the remainder of bulk plastic material 54 without allowing other contaminants to be removed with the water. In other words, substantially pure water is removed from bulk plastics 54 such that the substantially pure water may become a usable by-product instead of an unseparated, undesirable by-product of the reaction. By "substantially pure" Applicants mean that a trace amount of other material may be included in the water, wherein the trace amount does not chemically alter the properties of the separated by-product removed during the process.

As the water vapor enters vapor treatment vessel 26, the water vapor will encounter a controlled temperature environment. The environment within the treatment vessel 26 may be controlled, such as by energy system 12, in a manner to substantially ensure that the substance entering the vessel either remains in the gas phase or condenses from the gas to the liquid phase, as desired. In the case of the water vapor, the environment within treatment vessel 26 may ensure that the water vapor remains in the gas phase. In other words, vessel 26 may be heated to a temperature above the vaporization point of water, and/or the vacuum pressure increased, such that the water vapor from reactor 22 remains in the vapor phase as it is pulled through vessel 26 by vacuum system 44.

The water vapor may then exit treatment vessel 26 and enter fume scrubber 36, which may be a vessel containing a liquid, or aqueous media 56, such as pH adjusted or buffered water. Aqueous and inorganic species that are pyrolyzed to a gas phase in reactor 22 and then move through fume scrubber 36 may be absorbed and/or neutralized by aqueous media 56. In contrast, gaseous organic species that move through fume scrubber 36, such as either non-condensable gases (such as $C_1$-$C_4$ species) or higher molecular-weight species, may condense upon interaction with aqueous media 56 present in scrubber 36. Organic species that condense will form a layer on top of aqueous media 56 present in the scrubber and can be removed using chemical or mechanical methods. The non-condensable species may be captured and contained in an external pressure vessel 58 for use as an energy source in conjunction with energy system 12.

Chemical sensors 48 within system 10 may monitor the presence and/or absence, and the corresponding concentration of chemical species, such as chloride, bromide, or the like, and provide process feedback loops 50 to energy system 12, treatment vessel 26, and vacuum system 44. For example, when the amount of water vapor in pipe 32 falls to a predetermined set point or rate according to sensor 48 and control system 46, the next set point in the processing profile may be initiated, in which both the temperature and/or vacuum pressure are increased by modifying energy system 12 and vacuum system 44. These new set point conditions could be imparted to reactor 22 in a discrete, stepwise fashion, or in a linear gradient that gradually moves from set point to set point such that there is some dwell time corresponding to each predetermined set point.

One advantage of system 10 described herein is that the entire processing profile may be programmable and can be changed dynamically by control system 46 using feedback signals provided by sensors 48. Further, if a particular set of conditions comprising a processing profile exists or is developed that enables the end user to optimize the pyrolytic process, those conditions could easily be replicated for other reactors at the site.

Referring again to the system as shown, after the water vapor has left the system 10, the processing profile may be changed to a second set of predetermined conditions in which the predetermined temperature may be, for example, in a range of 270 to 330° C., such as a temperature of 300° C., with the pressure unchanged. At this temperature and pressure set point, chlorine in the polyvinylchloride (PVC) polymer chain will dehydro-dechlorinate, and chlorine gas and hydrochloric acid vapor will be released from reactor 22. These species will encounter vapor treatment vessel 26 and will, at this point in the processing profile, remain in the gas phase and continue as vapor until reaching fume scrubber 36. After the vapor enters fume scrubber 36 the species will be absorbed in scrubbing medium 56, with or without neutralization.

When process feedback sensors 48 indicate to process control system 46 a lack of new hydrochloric acid formation from reactor 22, or a level of hydrochloric acid below a predetermined minimum threshold, the processing profile may then be moved by control system 46 to the next set of predetermined processing conditions, which may target, for example, the elimination of bromine in the bulk plastic materials. Accordingly, for example, a third predetermined set point, may be a temperature of 325° C. with an unchanged pressure, i.e., 0.95 atm, wherein the temperature in a range of 300 to 375° C., such as a temperature of 325° C., may be slightly above a vaporization temperature of bromine. Accordingly, in this manner, chlorine and bromine and/or other contaminants within original bulk plastic materials 54 may be separately removed from the original bulk plastic materials 54 such that the separated by-products may themselves become desirable end products, instead of unseparated, undesirable system by-products that may require further separation.

After several of these "chromatographic speciation steps" in the processing profile, the remaining materials in reactor 22 may include only plastic polymer molecules in the liquid state and carbon solids that are non-volatile. At this point, the processing profile conditions in reactor 22 may be modified in order to begin cracking the polymeric backbone of the remaining bulk materials. At well defined temperature and pressure settings, the next molecules to enter the vapor phase may be large, targeted, carbon chains, for example, hydrocarbon chains having a length of $C_{20}$-$C_{60}$. These may exit reactor 22 and encounter vapor treatment vessel 26, where the environment of the treatment vessel 26 may cause the higher molecular weight hydrocarbons to condense into liquid form and exit vessel 26 gravimetrically through bottom exit port 34 to tank 40.

This path of hydrocarbon condensate may be facilitated by closing valve 38 on upper exit port 32, thereby preventing any large hydrocarbon molecules from entering fume scrubber 36. The processing profile would then be complete, and reactor 22 may be allowed to cool to ambient conditions of temperature and pressure. Any residual liquid and solid materials remaining in reactor 22 may then be removed from reactor 22 by opening port 28 and allowing the material(s) to enter waste solids container 30.

In this manner, waste plastic materials 54 may be treated and useful end products generated, such as cracked hydrocarbon material that may be utilized as petroleum fuel, water, chlorine and bromine, each individually separated from one another. The inventive system described may have a relatively low energy consumption, and may utilize relatively low pressures, compared with the methods of the prior art which typically use high temperatures and/or high pressures. Such high temperatures and pressures often lead to the formation of undesirable hydrocarbon species such as aromatic compounds and solid carbon waste. By avoiding such high temperatures and pressures, the inventive system described herein employs lower pyrolytic temperatures and longer exposure times, resulting in the formation of fewer undesirable hydrocarbons like aromatic species. This change in the temperature and time parameters also provides the system with the ability to crack plastic wastes only to the point that the resulting heavy oil may be further refined and/or modified using standard refinery technology, with no need for elaborate condensation systems. Moreover, the low temperatures and pressures utilized allow for a great deal of enhanced flexibility, because the oil produced may be further refined on-site or may be sold/transported to an offsite small-scale refining operation.

Accordingly, the inventive system 10 has the following advantages. The system provides a method of recycling mixed-waste and single source plastics 54 into immediately usable products. The system provides a method of isolating and removing volatile contaminants, such as chlorine, from the plastic feedstock before rendering the cracked plastics into usable products. The system provides a programmable system/method that adjusts to various blends or single-sources of feedstock so as to optimize the process and the resultant products, such as processing polystyrene to styrene monomer. Moreover, the use of a vacuum pulled on reactor 22 allows for complete elimination of separated vaporized components from the reactor prior to the next component being vaporized and removed from reactor 22.

Figure 2:
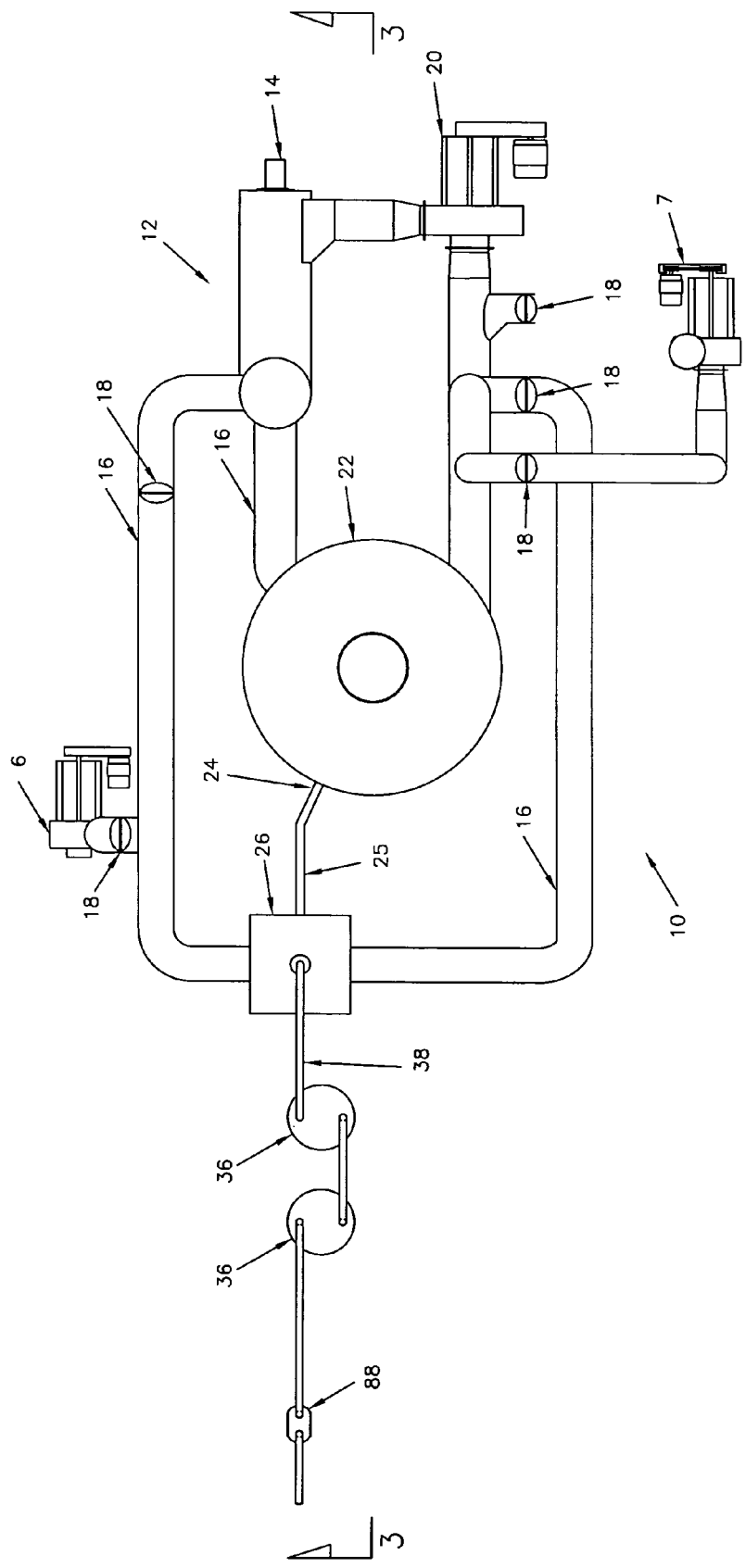
FIG. 2 is a plan view of the recycling system.

FIG. 2 is a plan view of the recycling system 10. In particular, energy system 12 is shown including a recirculation fan 20 and a burner 14. The energy source utilizes ductwork 16, dampers 18, cooling fan 6, and exhaust fan 7 to control temperature in the reactor 22 and the vapor treatment vessel 26.

Figure 3:
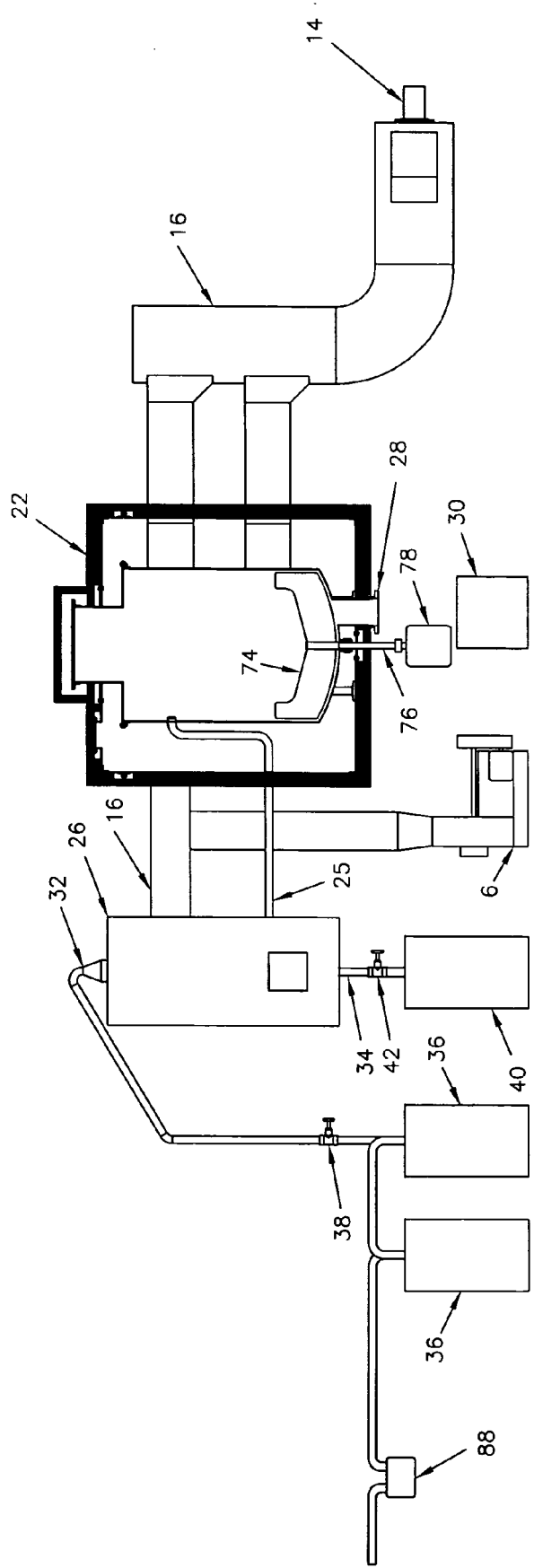
FIG. 3 is a cross sectional view of the system of FIG. 2 taken along section lines 3-3.

FIG. 3 is a cross sectional view of system 10 taken along section lines 3-3 of FIG. 2. Scrubber 36 is shown as drums positioned adjacent a vacuum pump 88 of vacuum system 44. Bulk storage tank 40 is shown as a drum positioned below vapor treatment vessel 26 and container 30 is shown as a tank positioned below reactor 22. Reactor 22 includes a stirring paddle 74, attached by a shaft coupling 76 to a motor 78.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiments were chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

I claim:

1. A system for recycling plastic material, comprising:
   a treatment chamber containing a material comprising plastic to be recycled;
   a heating system that heats said treatment chamber to a temperature that results in pyrolytic cracking of said plastic;
   a vacuum system that pulls a vacuum on said treatment chamber and removes vapor from said treatment chamber, wherein said vapor comprises pyrolyzed inorganic species and gaseous organic species resulting from said pyrolytic cracking of said plastic;
   a control system including computer operable instructions that control said heating system to heat said chamber in incremental steps through a series of graduated temperature set points;
   a vapor treatment vessel connected to said treatment chamber, said vapor treatment vessel including a vapor exit port, wherein said vapor treatment vessel comprises a reflux heat exchanger; and
   a fume scrubber connected to said vapor treatment vessel, wherein said fume scrubber comprises a pH adjusted or buffered aqueous media, and said vapor generated as a result of said pyrolytic cracking of said plastic is directly contacted by the aqueous media within said fume scrubber, resulting in condensation of gaseous organic species contained within said vapor.

2. The system of claim 1, further comprising a sensing system that detects an amount of a plurality of gaseous products contained within said vapor generated as a result of said pyrolytic cracking of said plastic pulled by said vacuum system from said treatment chamber, wherein said control system automatically controls said heating system based on information received by said control system from said sensing system.

3. The system of claim 2, wherein said sensing system detects when an amount of a first gaseous product pulled by said vacuum system from said treatment chamber falls below a predetermined first value, and wherein said control system thereafter controls said heating system to heat said treatment chamber from a first predetermined temperature to a second predetermined temperature.

4. The system of claim 3, wherein said sensing system detects when an amount of a second gaseous product pulled by said vacuum system from said treatment chamber falls below a predetermined second value, and wherein said control system thereafter controls said heating system to heat said treatment chamber from said second predetermined temperature to a third predetermined temperature.

5. The system of claim 1, wherein said heating system comprises a gas manifold that heats ambient air and a duct system that circulates said heated ambient air around said treatment chamber.

6. The system of claim 1, wherein said fume scrubber is connected to said vapor exit port of said vapor treatment vessel.

7. The system of claim 6, wherein said fume scrubber separates chlorine and bromine from an oil end product.

8. A system for recycling plastic material, comprising:
a treatment chamber containing a material comprising plastic to be recycled;
a heating system that heats said treatment chamber to a temperature that results in pyrolytic cracking of said plastic;
a vacuum system that pulls a vacuum on said treatment chamber and removes vapor from said treatment chamber, wherein said vapor comprises pyrolyzed inorganic species and gaseous organic species resulting from said pyrolytic cracking of said plastic;
a control system including computer operable instructions that control said heating system to heat said chamber in incremental steps through a series of graduated temperature set points; and
a vapor treatment system connected to said treatment chamber, said vapor treatment system configured to condense hydrocarbons contained within said vapor generated as a result of said pyrolytic cracking of said plastic and comprising a fume scrubber wherein said fume scrubber comprises a pH adjusted or buffered aqueous media, and said vapor generated as a result of said pyrolytic cracking of said plastic is directly contacted by the aqueous media within said fume scrubber, resulting in condensation of gaseous organic species contained within said vapor.

9. A system for recycling plastic material, comprising:
a treatment chamber containing a material comprising plastic to be recycled;
a heating system that heats said treatment chamber to a temperature that results in pyrolytic cracking of said plastic;
a vacuum system that pulls a vacuum on said treatment chamber and removes vapor from said treatment chamber, wherein said vapor comprises pyrolyzed inorganic species and gaseous organic species resulting from said pyrolytic cracking of said plastic;
a control system including computer operable instructions that control said heating system; and
a vapor treatment system connected to said treatment chamber, said vapor treatment system comprising a fume scrubber comprising a pH adjusted or buffered aqueous media, wherein said fume scrubber is configured such that, said vapor resulting from said pyrolytic cracking of said plastic is directly contacted by the aqueous media within said fume scrubber, resulting in condensation of gaseous organic species contained within said vapor.

10. The system of claim 9, wherein the control system generates computer operable instructions that control said heating system to heat said chamber in incremental steps through a series of graduated temperature set points.

11. The system of claim 10, further comprising a sensing system that detects an amount of a plurality of gaseous products pulled by said vacuum system from said treatment chamber, wherein said control system automatically controls said heating system based on information received by said control system from said sensing system.

12. The system of claim 11, wherein said sensing system detects when an amount of a first gaseous product pulled by said vacuum system from said treatment chamber falls below a predetermined first value, and wherein said control system thereafter controls said heating system to heat said treatment chamber from a first predetermined temperature to a second predetermined temperature.

13. The system of claim 12, wherein said sensing system detects when an amount of a second gaseous product pulled by said vacuum system from said treatment chamber falls below a predetermined second value, and wherein said control system thereafter controls said heating system to heat said treatment chamber from said second predetermined temperature to a third predetermined temperature.

14. The system of claim 9, wherein said heating system comprises a gas manifold that heats ambient air and a duct system that circulates said heated ambient air around said treatment chamber.

\* \* \* \* \*